United States Patent
Divine et al.

(10) Patent No.: US 7,978,376 B2
(45) Date of Patent: Jul. 12, 2011

(54) DIGITAL PHOTOGRAPHIC DISPLAY DEVICE

(75) Inventors: Abha S. Divine, Austin, TX (US); Donna M. Harrison, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1136 days.

(21) Appl. No.: 11/284,312

(22) Filed: Nov. 21, 2005

(65) Prior Publication Data
US 2007/0081196 A1    Apr. 12, 2007

Related U.S. Application Data

(63) Continuation-in-part of application No. 11/246,022, filed on Oct. 7, 2005.

(51) Int. Cl.
H04N 1/23 (2006.01)
(52) U.S. Cl. ........ 358/302; 345/418; 345/619; 345/643; 348/143
(58) Field of Classification Search .......... 358/302; 455/566; 725/134; 379/142.17; 345/418, 345/619, 643; 348/143
See application file for complete search history.

(56) References Cited

U.S. PATENT DOCUMENTS

| | | | |
|---|---|---|---|
| 3,251,151 A * | 5/1966 | Sherrill | 40/715 |
| 4,356,509 A | 10/1982 | Skerlos et al. | |
| 5,802,460 A | 9/1998 | Parvulescu et al. | |
| 6,321,158 B1 * | 11/2001 | DeLorme et al. | 701/201 |
| 6,393,401 B1 | 5/2002 | Loudermilk et al. | |
| 6,437,974 B1 | 8/2002 | Liu | |
| 6,535,590 B2 | 3/2003 | Tidwell et al. | |
| 6,791,597 B2 | 9/2004 | Ando et al. | |
| 6,791,620 B1 * | 9/2004 | Elswick et al. | 348/441 |
| 6,975,308 B1 * | 12/2005 | Bitetto et al. | 345/204 |
| 7,196,718 B1 * | 3/2007 | Barbeau et al. | 348/14.02 |
| 7,856,088 B2 * | 12/2010 | Janssen | 379/88.22 |
| 2002/0080255 A1 * | 6/2002 | Lichtfuss | 348/333.06 |
| 2003/0046231 A1 * | 3/2003 | Wu | 705/43 |
| 2003/0222895 A1 * | 12/2003 | Arai | 345/698 |
| 2004/0012608 A1 * | 1/2004 | Jeon | 345/600 |
| 2004/0062374 A1 * | 4/2004 | Lund | 379/218.01 |
| 2004/0097227 A1 * | 5/2004 | Siegel | 455/431 |
| 2004/0201774 A1 | 10/2004 | Gennetten | |
| 2004/0263522 A1 | 12/2004 | Goodfellow | |
| 2005/0007451 A1 * | 1/2005 | Chiang | 348/143 |
| 2005/0105705 A1 * | 5/2005 | Elcock et al. | 379/142.01 |
| 2005/0216949 A1 * | 9/2005 | Candelora et al. | 725/134 |
| 2006/0170669 A1 * | 8/2006 | Walker et al. | 345/418 |
| 2006/0242325 A1 * | 10/2006 | Ramaswamy et al. | 709/246 |
| 2006/0271968 A1 * | 11/2006 | Zellner | 725/81 |
| 2006/0281497 A1 * | 12/2006 | Lai et al. | 455/566 |
| 2007/0036313 A1 * | 2/2007 | White et al. | 379/142.17 |

FOREIGN PATENT DOCUMENTS

| | | | |
|---|---|---|---|
| JP | 10304034 A | * | 11/1998 |
| WO | WO 2004/057855 | | 7/2004 |

* cited by examiner

*Primary Examiner* — Chan S Park
*Assistant Examiner* — Allen H Nguyen
(74) *Attorney, Agent, or Firm* — Toler Law Group

(57) ABSTRACT

A digital photographic display frame includes a processor, a communication module responsive to the processor, and a touch screen display. The touch screen display is responsive to the processor to display a digital photographic image and to provide a touch screen number pad interface. The processor is configured to initiate a voice-over-internet protocol (VoIP) telephone call via the communications module in response to a number entered via the touch screen number pad interface.

20 Claims, 5 Drawing Sheets

DIGITAL PHOTOGRAPHIC DISPLAY DEVICE

CROSS-REFERENCE TO RELATED APPLICATIONS

The present application claims priority from U.S. patent application Ser. No. 11/246,022, filed Oct. 7, 2005, entitled "DIGITAL PHOTOGRAPHIC DISPLAY DEVICE," naming inventors Abha S. Devine and Donna Harrison, which application is incorporated by reference herein in its entirety.

FIELD OF THE DISCLOSURE

This disclosure, in general, relates to digital photographic display devices.

BACKGROUND

With the advent of digital photography, consumers are increasingly demanding methods and devices for displaying digitally photographed images. In response, manufacturers are producing printers capable of reproducing digitally photographed images on photo quality paper. In addition, service providers, such as film developers, are increasingly providing digital photography services for printing digitally photographed images and producing storage media, such as compact discs (CD) and digital video discs (DVD) with the images.

Further, manufacturers are producing electronic devices capable of displaying digitally photographed images on a screen or panel, often termed "digital picture frames." Such electronic devices typically include an electronic display screen configured to display a digital image. Images may be downloaded from a computer to a digital photograph display device.

DETAILED DESCRIPTION OF THE DRAWINGS

Figure 1:
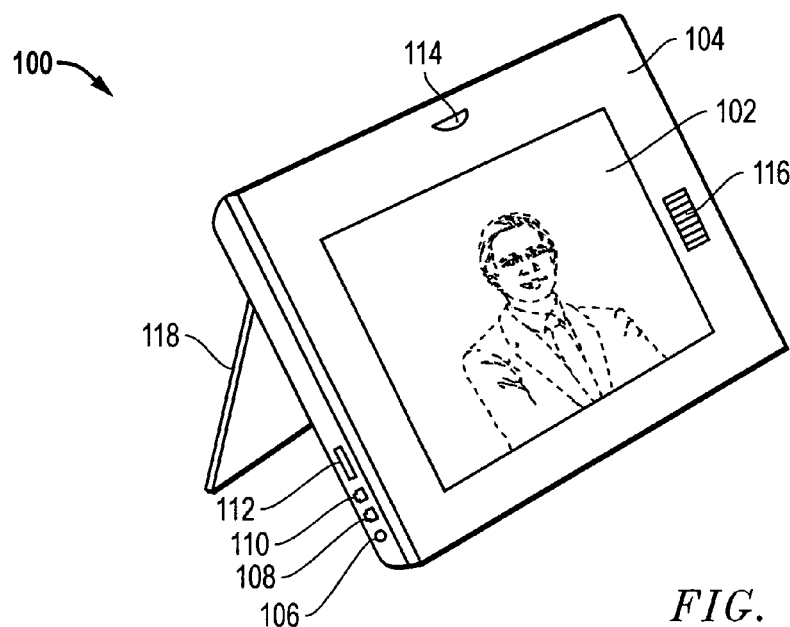
FIGS. 1, 2 and 3 include illustrations of an exemplary digital photographic display frame.

In a particular embodiment, the disclosure is directed to a digital photographic display frame including built-in voice-over-internet-protocol (VoIp) telephonic functions. The digital photographic display frame includes a frame surrounding a display screen. In one exemplary embodiment, the display device interfaces with a digital network or telephone system and manipulates images displayed on the display screen in response to incoming caller information. For example, the display device may select an image for display based on incoming caller identification information. In another exemplary embodiment, the digital photographic display frame functions as a speakerphone. In a particular example, the speakerphone may include a touch screen display configured to provide a number pad interface for dialing numbers. In a further exemplary embodiment, the digital photographic display frame interfaces with security systems, such as motion detectors, cameras and switches to provide an image of an area, such as displaying an entry area near a front door in response to pressing of a doorbell button, detection of motion, or a user selected "query" on the device.

In a particular embodiment, a digital photographic display frame includes a processor, a communication module responsive to the processor, and a touch screen display. The touch screen display is responsive to the processor to display a digital photographic image and to provide a touch screen number pad interface. The processor is configured to initiate a voice-over-internet-protocol (VoIP) telephone call via the communications module in response to a number entered via the touch screen number pad interface.

In another exemplary embodiment, a digital photographic display frame device includes a processor and a display screen to display a digital image. The display screen is responsive to the processor. The digital photographic display frame device further includes a decorative frame around the display screen and a voice-over-IP telephone module responsive to the processor.

In a further exemplary embodiment, a digital photographic display frame includes a processor, a display device to display a digital image, and a memory accessible to the processor. The memory stores a set of digital images. The digital photographic display frame further includes a voice-over-internet-protocol telephone module accessible to the processor, a speaker responsive to the processor, and a microphone accessible to the processor.

In a particular embodiment, the disclosure is directed to a digital photographic display frame including a processor, a display module configured to display a first digital photographic image, a telephone input module and a memory. The memory is accessible to the processor and configured to store a set of digital photographic images including the first digital photographic image and a second digital photographic image. The processor is configurable to initiate display of the second digital photographic image by the display module in response to telephone call data received at the telephone input module.

In another exemplary embodiment, the disclosure is directed to a computer readable media including computer-implemented instructions operable by a processor to perform a method of loading images to a digital photographic display. The method includes receiving a digital photographic image, associating the digital photographic image with caller information to produce association data, and transferring the association data to a digital photographic display frame.

In a further exemplary embodiment, the disclosure is directed to a digital photographic display frame including a processor, a display module responsive to the processor and configured to display a first digital photographic image, and a telephone input module accessible to the processor. The processor is configurable to manipulate the display module in response to telephone call data receive at the telephone input module.

In a particular embodiment, the disclosure is directed to a digital photographic display frame including a processor, a telephone module, and a touch screen display. The touch screen display is responsive to the processor to display a digital photographic image and to provide a touch screen number pad interface. The telephone module is configured to initiate a telephone call in response to a number entered via the touch screen number pad interface.

In another exemplary embodiment, the disclosure is directed to a digital photographic display frame device including a processor, a security signal input, a display screen, and a decorative frame proximate to the display screen. The processor is configured to initiate display of a digital image on the display screen in response to a signal received at the security signal input.

In a further exemplary embodiment, the disclosure is directed to a digital photographic display frame including a processor, a display device to display a digital image, a memory accessible to the processor, a telephone module accessible to the processor, a speaker responsive to the processor, and a microphone accessible to the processor. The memory may store a set of digital images.

FIG. 1 illustrates an exemplary digital photographic display frame 100 that includes a display screen 102 and a frame 104. The digital photographic display frame 100 further includes a power input port 106 and communications ports, such as telephone ports 108 and 110 and computer interface port 112. In addition, the digital photographic display frame 100 may include a speaker 116 and a microphone 114. Further, the digital photographic display frame 100 may include a stand or a support 118.

In general, the display screen 102 may be a flat panel display that corresponds to a photograph of a traditional picture frame. For example, the display screen 102 may take the size and shape of a traditional picture, such as 3×4 inches, 5×8 inches, or 8×10 inches. Alternatively, the display screen 102 may have a size and shape different from standard picture sizes. The display screen 102 may be a plasma screen, a liquid crystal display (LCD) screen, a light emitting diode (LED) screen, or a cathode ray tube (CRT). Particular embodiments of display screens 102 include active or passive matrix thin film transitor (TFT) LCD panels and active or passive matrix organic light emitting diode (OLED) panels. In one particular embodiment, the display screen 102 is a touch screen operable to provide a touch-based graphical user interface for interacting with a user.

In the illustrated embodiment, the decorative frame 104 surrounds and outlines the display screen 102. Alternatively, the frame 104 may support the screen or include decorative features in proximity to the screen. The frame 104 may be formed of decorative materials, such as glass, wood, or polished metal. In other exemplary embodiments, the decorative frame 104 is carved or shaped to include decorative features and, in further examples, the decorative frame 104 includes a surface that includes symbols or decals, providing additional decoration. In one exemplary embodiment, the decorative frame 104 is designed such that it is removable and may be replaced with alternative decorative frames. For example, the digital photographic display frame 100 may be sold with a plurality of different decorative frames 104 that may be swapped or replaced to suit the aesthetic tastes or desires of a user.

The decorative photographic digital display device 100 also includes a power input 106. The power input 106 may be a port for connection to an adapter that is plugged into a power supply. In an alternative embodiment, an adapter is built into the digital photographic display frame 100 and a cord is provided for plugging into a power supply. Alternatively, the digital photographic display frame 100 may include a battery power supply. The battery power supply may be used as a sole source for power or may be used in conjunction with an external power source. In another exemplary embodiment, the display device 100 may draw power from a communications interface. For example, power may be supplied via a universal serial bus (USB) connection or a plain old telephone service (POTS) line.

In one exemplary embodiment, the display device 100 includes an input port 108, such as a telephone input port. For example, the input port 108 may be configured to receive telephone jacks, such as an RJ-11 jack, an RJ-14 jack, or an RJ-45 jack. In a particular embodiment, the input port 108 may be configured to connect to a digital network, such as via an Ethernet cable plugged into the RJ-45 jack, which permits communication via an internet protocol (IP) compatible network for data communication and, in particular, voice-over-IP (VoIP) communication. The display device 100 may also include a second telephone interface port, such as interface port 110. The second interface port 110 may act as a telephonic output port or as an additional input port. For example, the second interface port 110 may provide an output telephone signal to a telephone. In an alternate embodiment, the second interface port 110 may be used to interface with a security system.

The display device 100 may also include an interface port 112 to a computational system, such as a personal computer. In one exemplary embodiment, the interface port 112 is a universal serial bus (USB) interface. Alternative embodiments of the interface port 112 include a serial port interface, a parallel port interface, a SCSI interface, a Firewire interface, or a wired network interface, such as an Ethernet interface. In alternative embodiments, the digital photographic display frame 100 may include a wireless interface (not shown), such as an 802.11 (a, b, or g) interface or a Bluetooth interface, configured to access wireless networks. In a further exemplary embodiment, the display device 100 may include a digital media interface (not shown), such as an interface to a digital media memory card, a memory stick, or a memory disk. In another exemplary embodiment, the display device 100 may communicate with another computational device via a telephonic interface port, such as port 108, using a modem.

In a further exemplary embodiment, the digital photographic display frame 100 includes a microphone 114 and a speaker 116. The microphone 114 may be configured to receive audio signals, such as the voice of a user. The speaker 116 is configured to produce audio signals, such as the output of a telephone call, music, or a prerecorded message.

In a further exemplary embodiment, the digital photographic display frame 100 may include a support or stand 118. Alternatively, the housing or the frame of the digital photographic display frame 100 may be adapted such that the device is free standing. In another exemplary embodiment, the digital photographic display frame 100 is configured to hang on a wall.

Exemplary embodiments of the digital photographic display frame 100 may have a length or width dimension of about 3 to about 15 inches. For example, the digital photographic display frame 100 may have a length of about 4 inches and a width of about 5 inches. In another example, the digital photographic display frame 100 has a length of about 10 inches and a width of about 12 inches. In a further example, the digital photographic display frame 100 has a length of about 5 inches and a width of about 4 inches. In one exemplary embodiment, the display screen 102 may adapt to show an image based on the orientation of the digital photographic display frame 100. For example, when the digital photographic display frame 100 is rotated, the display screen 102 may adapt to rotate a displayed image.

In a further example, the digital photographic display frame 100 may a thickness not greater than 5 inches. For example, the digital photographic display frame 100 may have a thickness not greater than 4 inches, such as not greater than 3 inches or not greater than 1 inch.

The illustration of FIG. 1 is intended to illustrate a particular configuration of a digital photographic display frame 100. Alternative embodiments may be envisaged that include various configurations of frames, housing designs, component arrangements and additional buttons and interface devices.

Figure 2:
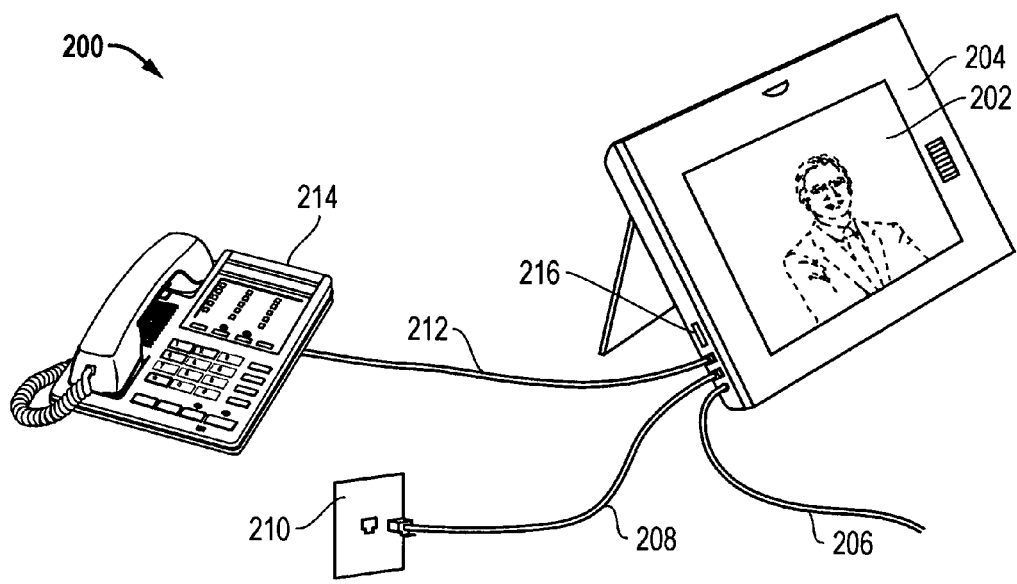

In a particular embodiment, the digital photographic display frame 200 interfaces with a telephone system, as illustrated in FIG. 2. For example, a digital photographic display frame 200 that includes a photographic display screen or panel 202 and a surrounding decorative frame 204 may interface with a telephonic system via connection 208 to a telephone outlet 210. In a particular embodiment, the telephone outlet 210 provides access to a public switched telephone network (PSTN). Alternatively, the telephone outlet 210 and, thus, the digital photographic display frame 200 may interface with a private branch exchange (PBX) system, or a digital telephone system, such as an IP-based network configured to provide VoIP communication.

In a particular embodiment, the digital photographic display frame 200 is configured to receive incoming telephone call data and to manipulate the display 202 in response to the incoming telephone call data. For example, the display device 200 may receive caller ID data associated with an incoming telephone call via the connection 208. The device 200 may include a set of images associated with the caller ID data and may select a particular image associated with the particular incoming caller ID data for display in the display screen or panel 202. In a further exemplary embodiment, the display device 200 may include a telephone module configured to interface with the telephone system, providing speakerphone functionality in the digital photographic display frame 200.

In addition to the input interface, the digital photographic display frame 200 may include an output telephone interface permitting the display frame 200 to interface with a telephone 214 via a connection 212. As such, a user may optionally access a telephone call via the telephone 214 or via speakerphone functionality of the digital photographic display frame 200. The digital photographic display frame 200 may also include a processor and a memory configured to operate as a digital answering machine.

The display device 200 may further include a data input port 216. In a particular embodiment, the data input port 216 may interface with a personal computer. Software may be provided with the digital photographic display frame 200 to permit a user to associate images with particular caller ID information, such as a caller's telephone number or name. Digital photographic images and data associating the images with particular caller information may be downloaded into the digital photographic display frame 200 via the digital input port 216. Alternatively, the data may be downloaded via a wireless interface.

Figure 3:
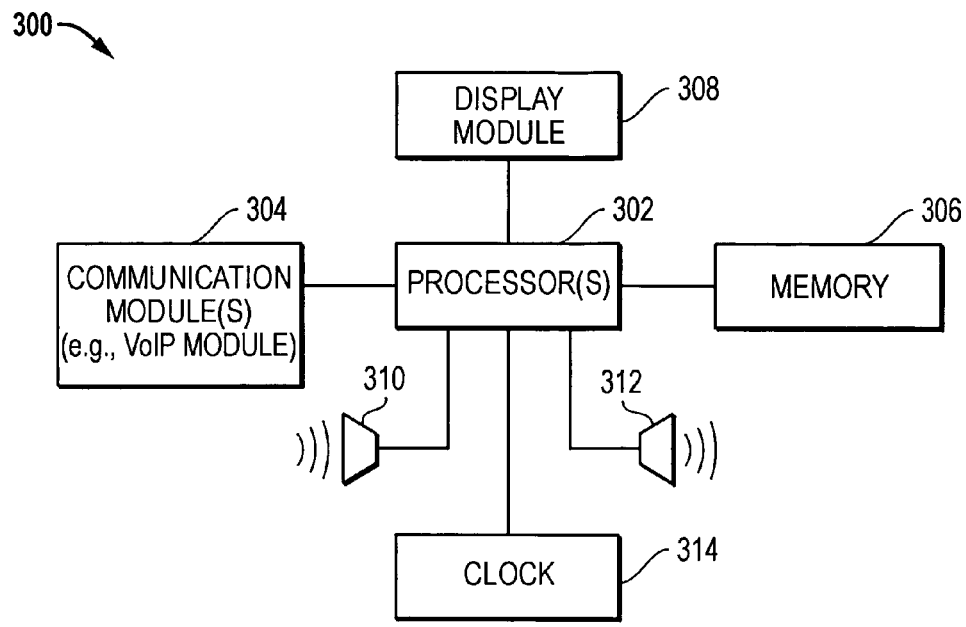

The digital photographic display frame may have one or more features or functions, such as a time and date display, a caller ID display, image manipulation and swapping in response to incoming telephone call data, speaker phone functionality, an address book, audio message recording, and digital answering machine functionality. In the example illustrated in FIG. 3, a digital photographic display frame 300 includes a processor 302 configured to interface with communications modules 304, a display module 308, and a memory 306 coupled to the processor 302 to provide various functions and features.

The memory 306 may include solid-state memory, optical memory or magnetic memory. For example, the memory 306 may include a disk drive, a Flash memory, or an optical media drive. In another exemplary embodiment, the memory 306 may be removable media, such as a digital media memory card, media stick, or disk. The memory 306 may be accessible to the processor 302 and may provide instructions to the processor 302. The processors 302 may implement one or more features of the digital photographic display frame 300 based on the stored instructions. In addition, the memory 306 may store a set of digital photographic images, data associating a digital photographic image with call data, and audio files. For example, the memory 306 may store a set of digital photographic images and a data table associating caller identification information with each digital photographic image.

In an exemplary embodiment, the digital photographic display frame 300 also includes communications modules 304. For example, the communications modules 304 may include telephone modules and data communications modules. As illustrated, the communications modules 304 are jointly connected to the processor 302. Alternatively, the communications modules 304 may be separately coupled to the processor 302.

In one embodiment, the telephone communications modules include input and output modules for communicating via traditional telephone networks, such as analog and digital telephone networks. In a particular embodiment, the communications modules 304 are configured to communicate via a digital network using VoIP protocols. Data communication modules may include wired and wireless data communication modules and interface modules to digital media, such as removable flash media. In a further embodiment, a security module may interface with a security system. The processor 302 may interface with the various communication modules 304 to transfer data to memory 306 or to manipulate the display screens associated with the display module 308.

In addition, the processor 302 may interface with a microphone 310, a speaker 312, and a clock 314. Particular functions of the digital photographic display frame 300 may be implemented by the processor 302 through interaction with the various components. For example, the processor 302 may implement the display of day and time information by interfacing with clock 314 and manipulating the display module 308.

In another exemplary embodiment, the processor 302 responds to incoming telephone call data and manipulates the display module 308 in response to or based upon the incoming telephone call data. For example, the processor 302 may implement or initiate display of caller ID data over a digital photographic image displayed via display module 308. In another exemplary embodiment, the processor 302 accesses memory 306 to select a particular image associated with the particular caller identification received in conjunction with the incoming call and the display of a particular image via the display module 308.

In a further example, the digital photographic display frame 300 includes speakerphone functionality. When the display module 308 includes a touch screen display panel, the processor 302 may interact with the display module 308 to implement a number pad graphical user interface for entry of telephone numbers. Alternatively, a number pad including buttons may be included in or connected to the digital photographic display frame 300. In response to receiving a number, the processor 302 may interact with microphone 310, speaker 312 and communication modules 304 to initiate a telephone call. In addition, the processor 302 may respond to an incoming call and provide speakerphone functionality in response to a user input, such as a user touching a touch screen or pressing a button.

In a particular embodiment, the processor 302 is configured to execute instructions stored in the memory 306 to implement VoIP speakerphone functionality. For example, the processor 302 may interact with speaker 312 and microphone 310 to provide acoustic signals associated with a telephone call to a user. The acoustic signals may be encoded and packaged in IP compatible packets and transmitted via the communications modules 304 over a digital network. In an example, the processor 302 is configured to initiate a VoIP telephone call in response to a number entered into an interface implemented in the touch screen display panel.

In a further exemplary embodiment, an address book is stored in the memory 306, and the processor 302 may implement a user interface via the display module 308 to permit access to the address book for selecting a number to dial or for entry of additional numbers. Address book entries may be received from another computational device, such as a personal computer. Alternatively, the address book entries may be received via an interface provided via the touch screen display panel.

In a further exemplary embodiment, the digital photographic display frame 300 may include digital answering machine features. The processors 302 may respond to an incoming telephone call by answering the incoming telephone call after a specified number of rings and providing an audio signal retrieved from the memory 306 to the communication modules 304. In addition, the processor 302 may compress and store received audio signals in the memory 306. To implement the answering machine features, the processor 302 may also implement a user interface via display module 308 to allow a user to select a message for retrieval and review. For example, the memory 306 may store an audio signal associated with the message and additional information associated with the incoming call, such as time, date and caller ID information. In one example, the answering machine interface provides the user with the ability to select a message to listen to and may also provide the ability to initiate a telephone call via the communication modules 304 to a telephone number associated with the recorded message.

In another exemplary embodiment, the digital photographic display frame 300 may include audio messages associated with particular images. A particular example includes playing a voice message from a loved one when the image of that loved one is displayed. For example, a user may associate a personal audio message with a digital photograph to be replayed upon display of the digital photograph. In one example, the processor 302 receives an audio message via the microphone 310 and stores the audio message in the memory 306. An interface may be provided to a user for associating a digital image with the audio message.

In a further exemplary embodiment, the digital photographic display frame 300 may include user defined text messages. Text messages may be displayed in association with particular images, in association with a time of day, and in response to receiving caller identification information.

The digital photographic display frame 300 may also be configured with alarm or calendaring features. In a particular embodiment, the alarm or calendaring feature may be implemented as a calendar module stored in the memory 306 and executable by the processor 302. For example, a user may be provided with an interface to specify an alarm, appointment time, or calendar event and associated audio signals, text messages, and photographic images. In addition, a user may be provided with an interface configured to associate a time of day or date with an image and to store a table including the time of day or date and reference to the image. As such, the display device may be configured to display a particular image at a particular time of day or a particular date and a second image at another time of day or date. In addition, the digital photographic display frame 300 may be configured to receive an alarm or alert message from a remote calendar system. For example, the digital photographic display frame 300 may be configured to receive an alarm or calendar event from a remote system via the communication modules 304, such as via a telephone module or data network module, and, in response to the alarm or calendar event, the digital photographic display frame 300 may display text, an image, or a visual cue, or play an audio signal, such as an alarm or voice message.

Figure 4:
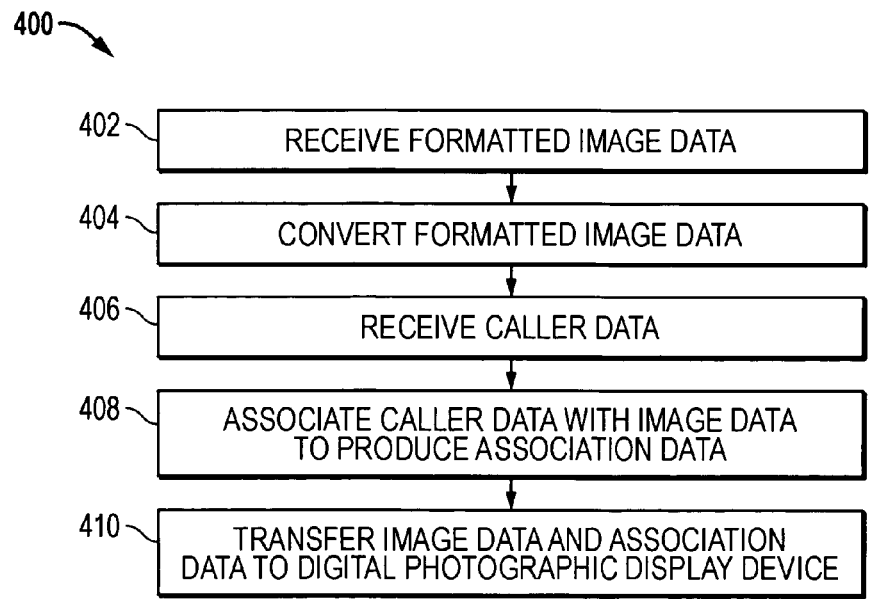
FIGS. 4, 5, 6 and 7 include illustrations of exemplary methods for use with a digital photographic display frame, such as the exemplary digital photographic display frame illustrated in FIGS. 1, 2 and 3.

FIG. 4 includes an illustration of an exemplary method 400 for use in conjunction with a digital photographic display frame. In a particular embodiment, the method 400 may be implemented as a set of computer implemented instructions for use in a personal computer or by a processor or computational device where the set of instructions are stored on a computer readable media. In another exemplary embodiment, portions or each of the steps of the method 400 may be implemented within the digital photographic display frame.

In one example, formatted image data, such as a digital photographic image, is received, as illustrated at 402. The formatted image data may or may not be in a format compatible with the digital photographic display frame. As such, the formatted image data may be converted, as illustrated at 404. For example, the formatted image data may be in a standard format such as JPEG, PIC, bitmap, PNG, and GIF. The digital photographic display frame may, for example, be configured to display images formatted in a specific format, a limited set of formats, or a proprietary format. The digital photographic display frame may also have limits or ranges of appropriate resolutions, sizes, shapes and color format. The image data may be converted to an appropriate format, size, shape, color format or resolution based on the functionality of the digital photographic display frame.

When a user desires to associate a particular photographic image with a caller, the user enters call data that identifies the caller and the system receives the call data from the user, as illustrated at 406. In the exemplary method 400, the system associates the call data, such as caller information, with the image data to produce association data, as illustrated at 408. For example, the association data may include a table including caller information associated with a photographic image. In a particular embodiment, entering the call data and producing the association data may be performed within a digital photographic display frame having an interactive user interface.

Alternatively, the call data may be received at a personal computer and the association data may be formed at the personal computer. The image data and the association data may be transferred to the photographic display device, as illustrated at 410. For example, the image data and association data may be transferred using a digital media card, via a network connection, via a modem, or via a direct digital connection.

When implemented in the digital photographic display frame itself, the method may include receiving the image data, receiving call data, and associating the call data with the image data to produce the association data within the digital photographic display frame. The association data and image data may be stored within a memory of the digital photographic display frame. In a further embodiment, the digital photographic display frame may provide a web-based interface via a network connection through which a user may associate images and caller information when accessing the web-based interface from a remote system. For example, a user may access the digital photographic display via a browser implemented in a computer having network access. As such, the digital photographic display frame may provide local and remote access to graphical user interfaces for device setup. In addition, other interfaces, such as address book interfaces, device preference interfaces, alarm interfaces, and image selection interfaces, may be provided via local and web-based graphic user interfaces.

The digital photographic display frame may respond to telephone call data by manipulating the display of the digital photographic display frame. The call data may be incoming telephone call data, such as caller identification data, or the call data may be outgoing telephone call data, such as a telephone number entered by a user.

Figure 5:
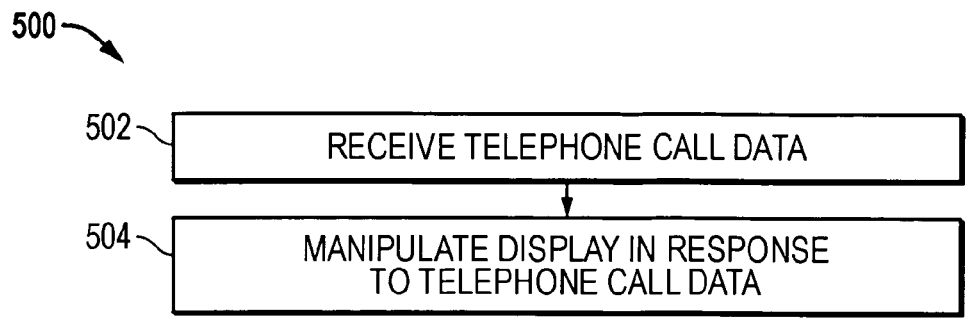

FIG. 5 includes an illustration of an exemplary method 500 in which a digital display device responds to telephone call data. The digital photographic display frame receives telephone call data, as illustrated at 502. In response to the telephone call data, the digital display device manipulates a display screen, as illustrated at 504. For example, the digital display device may display incoming caller identification data in the display screen of the digital photographic display frame. In another example, the device may select a particular digital photographic image based on incoming caller data. In a further exemplary embodiment, when a user enters a telephone number, a particular image may be selected for display.

Figure 6:
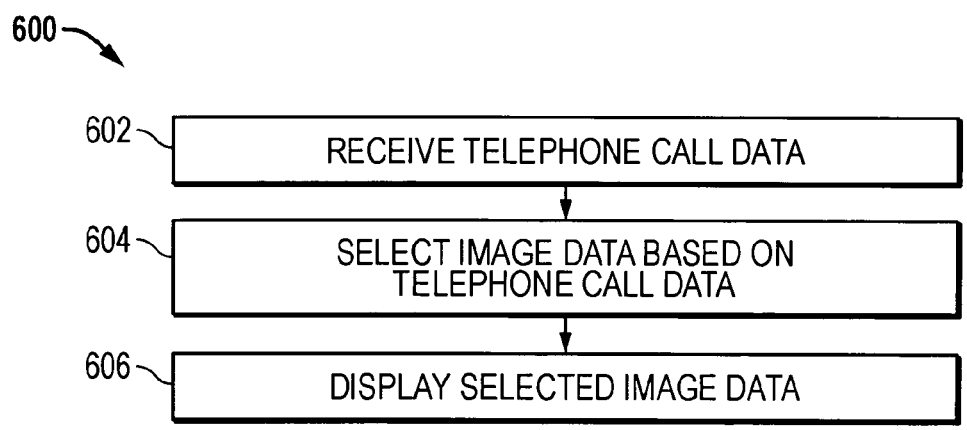

For example, FIG. 6 includes an illustration of an exemplary method 600 for displaying a particular image in response to caller identification data. The method includes receiving telephone call data, as illustrated at 602. For example, the telephone call data may include a telephone number or caller identification. Based on the telephone call data, a particular image is selected, as illustrated at 604. For example, a memory of the display device may store data associating digital images with particular telephone numbers or caller identifications. Once an image is selected, the display is manipulated to display the selected image, as illustrated at 606. In a particular embodiment, the display replaces a first displayed digital image with a selected digital image. In an alternative embodiment, a second image associated with the selected image may be displayed in a manner to overlap a portion of the first displayed digital image. In addition to responding to incoming telephone calls, the digital photographic display frame may be configured to respond to signals from systems, such as security systems. Increasingly, security systems are being developed that utilize existing telephone wires, data lines, or wireless protocols. For example, motion sensors and switches have been developed using communications standards, such as the X10 standard, for communication via existing telephone lines or power lines. In another example, cameras are developed to communicate via existing telephone lines, power lines, or via wireless interfaces. In a particular embodiment, the digital photographic display frame may be configured to respond to signals from security systems and interface with security components.

Figure 7:
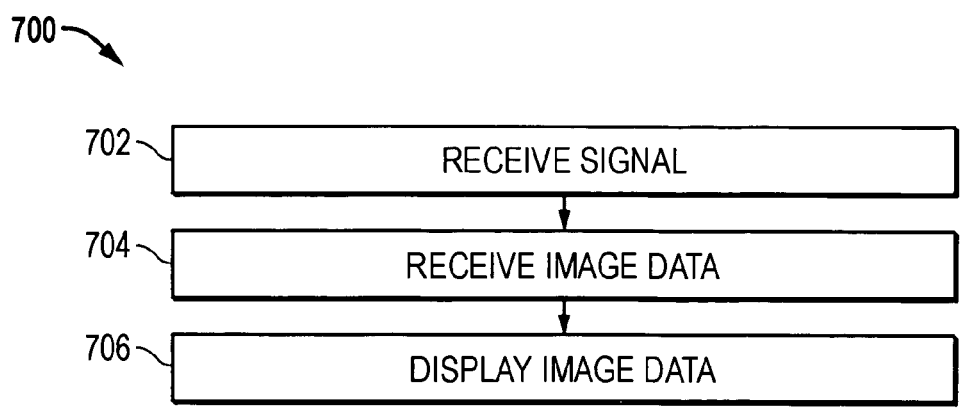

FIG. 7 includes an illustration of an exemplary method 700 for interfacing with security components. A signal may be received from a security system, as illustrated at 702. For example, a doorbell or motion sensor may be coupled to existing telephone lines or power lines within a home or building. Alternatively, such devices may be provided with wireless interfaces. The digital photograph display frame may receive the signal via existing telephone interfaces, data communications modules, or power supplies. In addition, the digital photographic display frame may interface with image capturing security devices, such as cameras, via the telephone network, power lines, or via data interfaces. The digital photographic display frame may receive image data from the image-capturing device, as illustrated at 704, and may display the image data, as illustrated at 706. In addition, the decorative photographic display frame may store the captured image data and an associated time stamp and other signal data in a memory. In a particular embodiment, the display frame provides an interface for a user to review images associated with past security signals. The display frame may overlay the image data over a first displayed photograph or may replace the first displayed with the image data.

Figure 8:
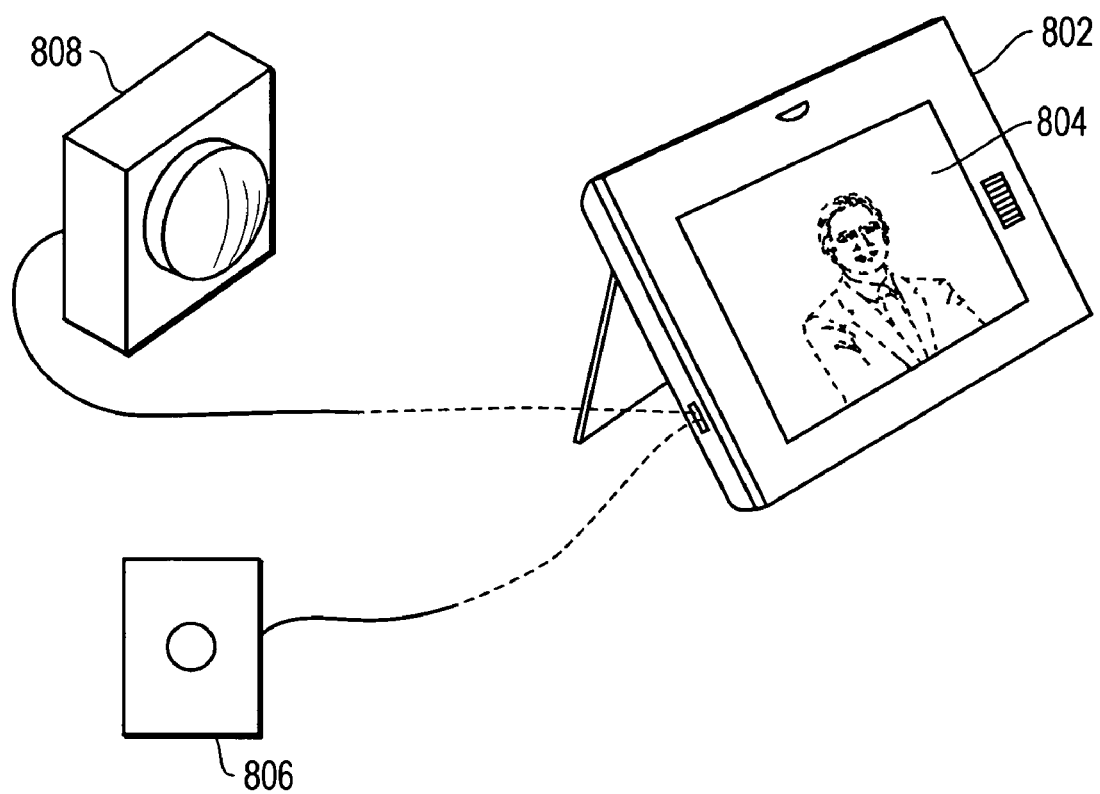
FIG. 8 includes an illustration of another embodiment of a digital photographic display frame.

FIG. 8 illustrates an exemplary embodiment of a system 800 for displaying security images in a decorative digital photographic display system. In this particular embodiment 800, a digital photographic display frame 802 including a display screen 804 is coupled to security devices, via existing telephone lines or power lines. For example, the digital photographic display frame 802 may communicate with a security device, such as a motion sensor or button 806. In a particular embodiment, the motion sensor or button, acting as a doorbell, may be located at a front door of a residence. In response to receiving security signals, such as a security signal responding to movement or motion at the front door, the photographic display device accesses camera 808 to acquire an image for display in the display screen 804. The system 800 may further provide an audio indication, such as an audio alarm via a speaker of the digital photographic display frame 802. In another example, the digital photographic display frame 802 is configured to display text, such as user defined text. In a further example, the digital photographic display frame 802 may be configured to provide additional visual indications in response to an alarm or phone call, such as flashing or changing color.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement methods described herein.

It should also be noted that software that implements the disclosed methods may optionally be stored on a tangible storage medium, such as a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure contemplates a machine readable medium containing instructions, or that which receives and executes instructions associated with a propagated signal, so that a device connected to a network environment can send or receive voice, image or data to communicate over the network.

Figure 9:
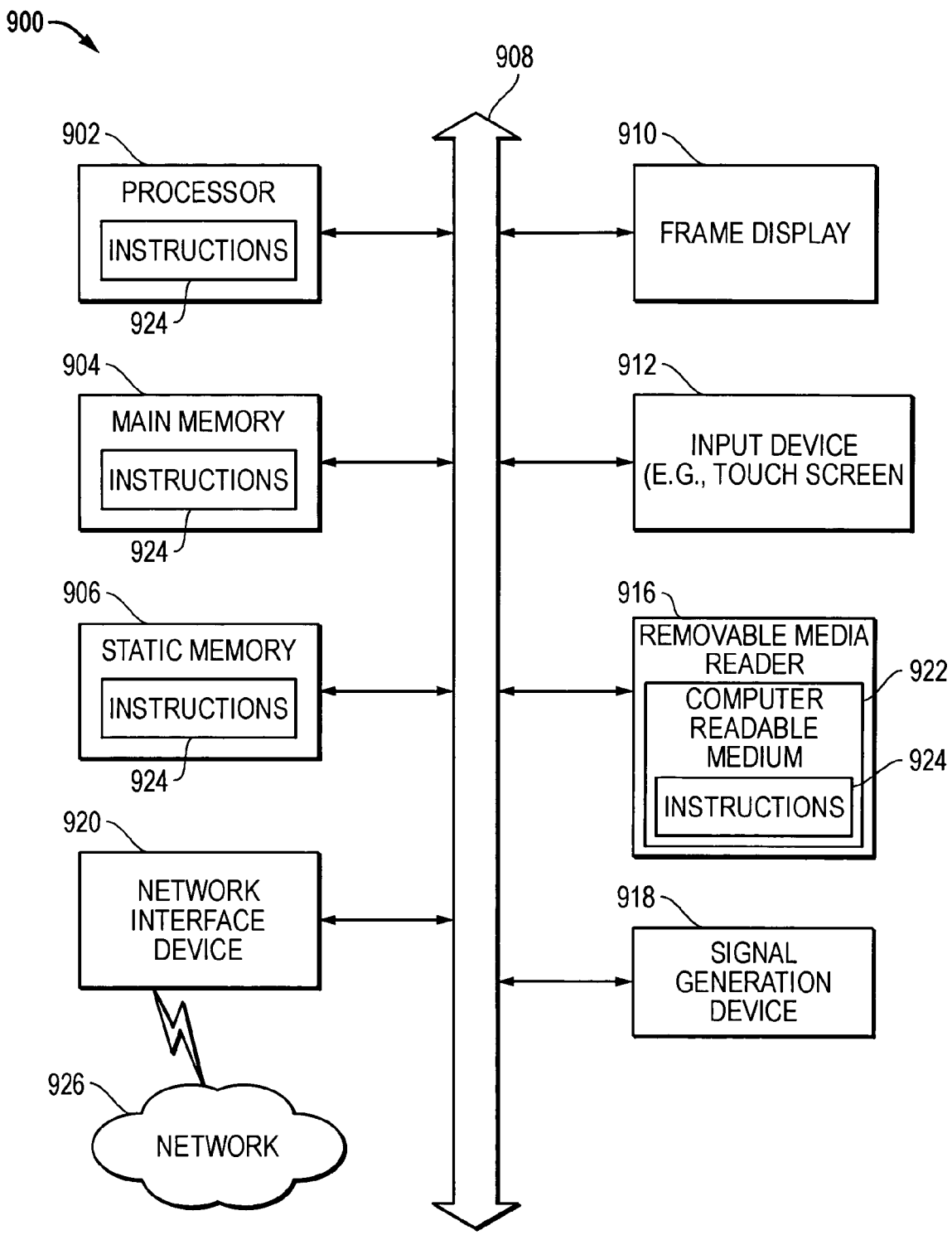
FIG. 9 includes an illustration of a general computer system.

Referring to FIG. 9, an illustrative embodiment of a general system that could be used to implement the digital photographic display frame as described herein is shown and is designated 900. The digital photographic display frame 900 can include a set of instructions that can be executed to cause the digital photographic display frame 900 to perform any one or more of the methods or functions disclosed herein. The digital photographic display frame 900 may operate as a standalone device or may be connected, e.g., using a network, to other computer systems or peripheral devices.

As illustrated in FIG. 9, the digital photographic display frame 900 may include a processor 902, e.g., a central processing unit (CPU), a graphics processing unit (GPU), or both. Moreover, the digital photographic display frame 900 can include a main memory 904 and a static memory 906, which can communicate with each other via a bus 908. As shown, the digital photographic display frame 900 may further include a frame display unit 910, such as a liquid crystal display (LCD), an organic light emitting diode (OLED), a flat panel display, a solid state display, or a cathode ray tube (CRT). Additionally, the digital photographic display frame 900 may include an input device 912, such as a touch screen portion of a display. The digital photographic display frame 900 can also include a removable media reader 916, a signal generation device 918, such as a speaker, and a network interface device 920. In an example, the network interface device 920 may be a digital network interface device to interface with a packet based communication network or may be an analog network interface device to interface with an analog PSTN network.

In a particular embodiment, as depicted in FIG. 9, the removable media reader 916 may include a computer-readable medium 922 in which one or more sets of digital data 924, e.g. software, digital image data, or tables, can be embedded. Further, the data 924 may include instructions embodying one or more of the methods or logic as described herein. In a particular embodiment, the instructions may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network 926 can communicate voice, images or data over the network 926. Further, the instructions 924 may be transmitted or received over the network 926 via the network interface device 920. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A digital photographic display frame comprising:
a processor;

a non-transitory tangible memory including instructions that are executable by the processor;
a communication module responsive to the processor; and
a touch screen display, the touch screen display responsive to the processor to display a digital photographic image and to provide a touch screen number pad interface, wherein the instructions are executable by the processor to:
provide a graphical user interface at the touch screen display to enable associating a first time of day with a first digital photographic image and to store a table including the first time of day and a reference to the first digital photographic image and a second time of day and a second reference to a second digital photographic image to enable the touch screen display to display the first digital photographic image at the first time of day and to display the second digital photographic image at the second time of day, the first digital photographic image different from the second digital photographic image;
receive a third digital photographic image in a first format via the communication module;
convert the third digital photographic image from the first format to a second format that is compatible with the touch screen display in response to determining that the first format is incompatible with the touch screen display;
associate an audio message with a fourth digital photographic image, wherein when the fourth digital photographic image is displayed, the audio message is played;
display a text message that is associated with at least one of a particular time of day, a fifth digital photographic image, and a particular caller identifier;
display a second text message in response to receiving an alert message from a remote calendar system;
initiate a voice-over-internet-protocol (VoIP) telephone call via the communication module in response to a number entered via the touch screen number pad interface; and replace a sixth digital photographic image that is displayed at the touch screen display with a seventh digital photographic image, the seventh digital photographic image associated with the number entered via the touch screen number pad interface; and
a security interface capable of being coupled to a security system that includes at least a camera, wherein the touch screen display is operable to switch from displaying one of a plurality of digital photographic images to displaying image data from the camera in response to at least one of a pressing of a doorbell button, a detection of motion, and a user selected query, wherein the plurality of digital photographic images includes at least one of the first, the second, the third, the fourth, the fifth, the sixth, and the seventh digital photographic images.

2. The digital photographic display frame of claim 1, wherein the non-transitory tangible memory further includes a set of digital photographic images.

3. The digital photographic display frame of claim 2, wherein a digital photographic image of the set of digital photographic images is associated with incoming call information.

4. The digital photographic display frame of claim 2, wherein the non-transitory tangible memory further includes an address book, and wherein at least one entry of the address book includes a phone number.

5. The digital photographic display frame of claim 4, wherein the touch screen display is further configured to enable selection of an entry of the address book to initiate an outgoing call.

6. The digital photographic display frame of claim 1, wherein the processor is configured to store the image data and a timestamp associated with the image data at the non-transitory tangible memory.

7. The digital photographic display frame of claim 1, further comprising replacing the digital photographic image with an eighth digital photographic image in response to receiving incoming telephone call data.

8. The digital photographic display frame of claim 1, further comprising a speaker, the processor configured to provide an audio signal to the speaker, the audio signal associated with the voice-over-IP telephone call.

9. The digital photographic display frame of claim 1, further comprising a microphone, the processor configured to receive an audio signal from the microphone.

10. The digital photographic display frame of claim 1, further comprising a decorative wooden frame surrounding the touch screen display, wherein the decorative wooden frame is replaceable with a second decorative wooden frame.

11. A digital photographic display frame device comprising:
a processor;
a display screen to display a digital image;
a non-transitory tangible memory including instructions that are executable by the processor, wherein the instructions are executable by the processor to:
provide a graphical user interface at the display screen to enable associating a first time of day with a first digital image and to store a table including the first time of day and a reference to the first digital image and a second time of day and a second reference to a second digital image to enable the display screen to display the first digital image at the first time of day and to display the second digital image at the second time of day, the first digital image different from the second digital image;
receive a third digital image in a first format;
convert the third digital image from the first format to a second format that is compatible with the display screen in response to determining that the first format is incompatible with the display screen;
associate an audio message with a fourth digital image, wherein when the fourth digital image is displayed, the audio message is played;
display a text message that is associated with at least one of a particular time of day, a fifth digital image, and a particular caller identifier;
display a second text message in response to receiving an alert message from a remote calendar system;
display a sixth digital image at the display screen and replace the sixth digital image with a seventh digital image when the seventh digital image is associated with outgoing call data;
a decorative frame around the display screen, the decorative frame configured to be hung on a wall;
a voice-over-internet-protocol (VoIP) telephone module responsive to the processor; and
a security interface capable of being coupled to a security system that includes at least a camera, wherein the display screen is operable to switch from displaying one of a plurality of digital images to displaying image data from the camera in response to at least one of a pressing of a doorbell button, a detection of motion, and a user selected query, wherein the plurality of digital images includes at least one of the first, the second, the third, the fourth, the fifth, the sixth, and the seventh digital images.

12. The digital photographic display frame of claim 11, wherein the display screen includes a touch screen display configured to display a number pad interface.

13. A digital photographic display frame comprising:
a processor;
a display device to display a digital image;
a non-transitory tangible memory accessible to the processor, the non-transitory tangible memory to store instructions that are executable by the processor;
a voice-over-internet-protocol telephone module accessible to the processor;
a speaker responsive to the processor; and
a microphone accessible to the processor,
wherein the instructions are executable by the processor to:
provide a graphical user interface at the display device to enable associating a first time of day with a first digital image and to store a table including the first time of day and a reference to the first digital image and a second time of day and a second reference to a second digital image to enable the display device to display the first digital image at the first time of day and to display the second digital image at the second time of day, the first digital image different from the second digital image;
receive a set of digital images;
determine whether at least one digital image of the set of digital images is in a first format that is incompatible with the display device;
convert the at least one digital image from the first format to a second format that is compatible with the display device;
store the set of digital images at the non-transitory tangible memory;
store data at the non-transitory tangible memory associating a third digital image from the set of digital images with outgoing call data;
replace the at least one digital image with the third digital image when the outgoing call data is received;
associate an audio message with a fourth digital image, wherein when the fourth digital image is displayed, the audio message is played;
display a text message that is associated with at least one of a particular time of day, a fifth digital image, and a particular caller identifier; and
display a second text message in response to receiving an alert message from a remote calendar system; and
a security interface capable of being coupled to a security system that includes at least a camera, wherein the display device is operable to switch from displaying one of a plurality of digital images to displaying image data from the camera in response to a detected event, wherein the plurality of digital images includes at least one of the first, the second, the third, the fourth, and the fifth digital images.

14. The digital photographic display frame of claim 13, wherein the non-transitory tangible memory further includes instructions executable by the processor to implement answering machine functionality, the non-transitory tangible memory configured to store audio messages associated with the answering machine functionality.

15. The digital photographic display frame of claim 13, wherein the display device includes a touch screen display.

16. The digital photographic display frame of claim 15, wherein the non-transitory tangible memory further includes instructions executable by the processor to provide a number pad interface configured to receive numerical input on the touch screen display.

17. The digital photographic display frame of claim 13, wherein the non-transitory tangible memory is configured to store data associating a sixth digital image with a particular set of incoming call data.

18. The digital photographic display frame of claim 13, wherein the detected event includes at least one of a pressing of a doorbell button, a detection of motion, and a user selected query.

19. The digital photographic display frame of claim 18, wherein the display device is configured to display the digital image based on an orientation of the decorative frame.

20. The digital photographic display frame of claim 13, further comprising a clock, wherein the display device is responsive to the clock to display a seventh digital image based on a date associated with the clock.

* * * * *